US008179873B2

(12) United States Patent
Bonta et al.

(10) Patent No.: US 8,179,873 B2
(45) Date of Patent: May 15, 2012

(54) METHOD TO QUITE CONSECUTIVE NARROW BAND CHANNELS

(75) Inventors: Jeffrey D. Bonta, Arlington Heights, IL (US); George Calcev, Hoffman Estates, IL (US); Nathan J. Smith, Crystal Lake, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 750 days.

(21) Appl. No.: 12/251,096

(22) Filed: Oct. 14, 2008

(65) Prior Publication Data

US 2010/0091716 A1    Apr. 15, 2010

(51) Int. Cl.
H04W 4/00    (2009.01)
(52) U.S. Cl. .......................................... 370/338
(58) Field of Classification Search .................. None
See application file for complete search history.

(56) References Cited

U.S. PATENT DOCUMENTS

| | | | |
|---|---|---|---|
| 7,280,801 | B2 | 10/2007 | Dahl |
| 7,321,762 | B2* | 1/2008 | Hoeben ............... 455/412.2 |
| 2004/0202689 | A1 | 10/2004 | Backes et al. |
| 2004/0242252 | A1 | 12/2004 | Hoeben |
| 2005/0286446 | A1 | 12/2005 | Barber |
| 2006/0165114 | A1* | 7/2006 | Diepstraten et al. ....... 370/445 |
| 2007/0218841 | A1 | 9/2007 | Wright |
| 2009/0010275 | A1* | 1/2009 | Diepstraten et al. ....... 370/445 |
| 2009/0225742 | A1 | 9/2009 | Yuechun et al. |
| 2010/0029325 | A1* | 2/2010 | Wang et al. ............ 455/553.1 |
| 2010/0091717 | A1* | 4/2010 | Bonta et al. ............... 370/329 |

FOREIGN PATENT DOCUMENTS

WO    WO 2005/125248 A1    12/2005

OTHER PUBLICATIONS

Imad Aad, et al., "Differentiation Mechanisms for IEEE 802.11," Proceedings, In INFOCOM 2001, Twentieth Annual Joint Conference of the IEEE Computer and Communications Societies, IEEE 2001, Anchorage, Alaska, USA Apr. 22-26, 2001, vol. 1, pp. 209-218.
Sang Hyun Park, "Corresponding Application PCT/US2009/058781—PCT International Search Report and Written Opinion," WIPO, ISA/KR, Korean Intellectual Property Office, Daejeon, Republic of Korea, May 3, 2010, 11 pages, most relevant 6-7 and 10-11.
IEEE, "IEEE P802.11n/D2.04, Section 11.16," IEEE Standards Committee Draft, Jun. 2007, pp. 218-221.

* cited by examiner

*Primary Examiner* — Anh-Vu Ly
(74) *Attorney, Agent, or Firm* — Randi L. Karpinia (57) ABSTRACT

A method and apparatus for quieting multiple channels is provided herein. During operation, transmission activity on each channel is analyzed and a best band is identified. Once the band is chosen, a wideband transmitter is utilized to transmit simultaneous reservation messages on consecutive channels simultaneously. Because a wideband transmitter is used to transmit simultaneous reservation messages on multiple consecutive channels, the above procedure quickly quiets multiple channels while minimizing the reservation duration of all channels as a result of quieting the channels.

13 Claims, 5 Drawing Sheets

METHOD TO QUITE CONSECUTIVE NARROW BAND CHANNELS

FIELD OF THE INVENTION

The present invention relates generally to communication systems and in particular, to a method and apparatus to quiet transmissions on consecutive narrow band channels.

BACKGROUND OF THE INVENTION

Recent developments within IEEE 802 have required calls for 100 Mbps throughput in mobile environments and 1 Gbps throughput in nomadic environments. In December 2006, the 802.16m task group was formed to address these requirements. In May 2007, the IEEE 802 Executive Committee granted an 802.11 working group request to form a new study group called 802.11VHT (very high throughput) to address this requirement.

The spectrum that will be used by 802.16m and 802.11vht has not been identified yet, but it is anticipated that these throughput rates will require 80 to 100 MHz of bandwidth. Unlicensed spectrum is one of the options for both 802.16m and 802.11vht. Finally, spectrum sharing and coexistence between 802.16 and 802.11 is also a requirement of 802.16h.

A broader problem to solve is how to enable a secondary TDMA-based system such as IEEE 802.16m or 3GPP LTE to coexist with a primary CSMA-based system such as IEEE 802.11. The problem is complicated by the need to utilize multiple consecutive unlicensed channels to form a broadband channel on the order of 80-100 MHz of bandwidth. This would require the ability to enable a regular frame boundary to be established simultaneously over multiple instantiations of primary system deployments such that each primary system's CSMA MAC offers a TDMA-like frame period for the secondary system.

To reserve 80-100 MHz of spectrum, 3 or more consecutive channels must be quieted. A problem in using prior-art techniques to quiet channels one-by-one (serially) is that while one idle channel is being quieted by the single transceiver, the multiple adjacent channels may transition from busy to idle, thus giving the primary system users an opportunity to grab one of the idle channels before the secondary system transceiver can get around to quieting each of the newly idled channels. This can cause additional latency as the transceiver must iterate the monitoring/quieting/reservation procedure until it successfully reserves all channels. Therefore a need exists for a method and apparatus to quiet multiple primary channels (e.g. WLANs) operating on an unlicensed band that alleviates the shortcomings of the prior art. Once reserved, the channels can be used by the secondary wideband system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for quieting multiple channels on unlicensed spectrum is provided herein. During operation, transmission activity on each channel is analyzed and a best band is identified. Once the band is chosen, a wideband transmitter is utilized to transmit simultaneous reservation messages on consecutive channels simultaneously.

Because a wideband transmitter is used to transmit simultaneous reservation messages on multiple consecutive channels, the above procedure quickly quiets multiple channels in a fair manner while minimizing the reservation duration of all channels as a result of quieting the channels.

The present invention encompasses a method for a first communication system to quiet multiple channels being utilized by a second communication system. The method comprises the steps of monitoring channels utilized by the second communication system, determining that available bandwidth does not exist for transmission by the first communication system, and quieting multiple consecutive channels. The multiple consecutive channels are quieted by simultaneously transmitting a message on each of the consecutive channels, where the message is synthesized as one message transmission with a single wideband radio. A determination is made that additional channels of the second communication system have become available, and transmission takes place on the multiple consecutive channels and the additional channels.

The present invention additionally encompasses an apparatus comprising a single receiver monitoring channels utilized by the second communication system, a single transmitter, and logic circuitry determining that available bandwidth does not exist for transmission by the first communication system and instructing the transmitter to quiet multiple consecutive channels by simultaneously transmitting a message on each of the consecutive channels. The message is synthesized as one message transmission with a single wideband radio.

The present invention additionally encompasses a method for a first communication system to quiet multiple channels being utilized by a second communication system. The method comprises the steps of utilizing a single receiver to monitor channels utilized by the second communication system, determining that available bandwidth does not exist for transmission by the first communication system, and utilizing a single transmitter to quiet multiple consecutive channels by simultaneously transmitting a CTS-to-self message or training symbols on each of the consecutive channels. The message is synthesized as one message transmission transmitted by the single transmitter. A determination is then made that additional channels of the second communication system have become available and transmission takes place on the multiple consecutive channels and the additional channels.

Figure 1:
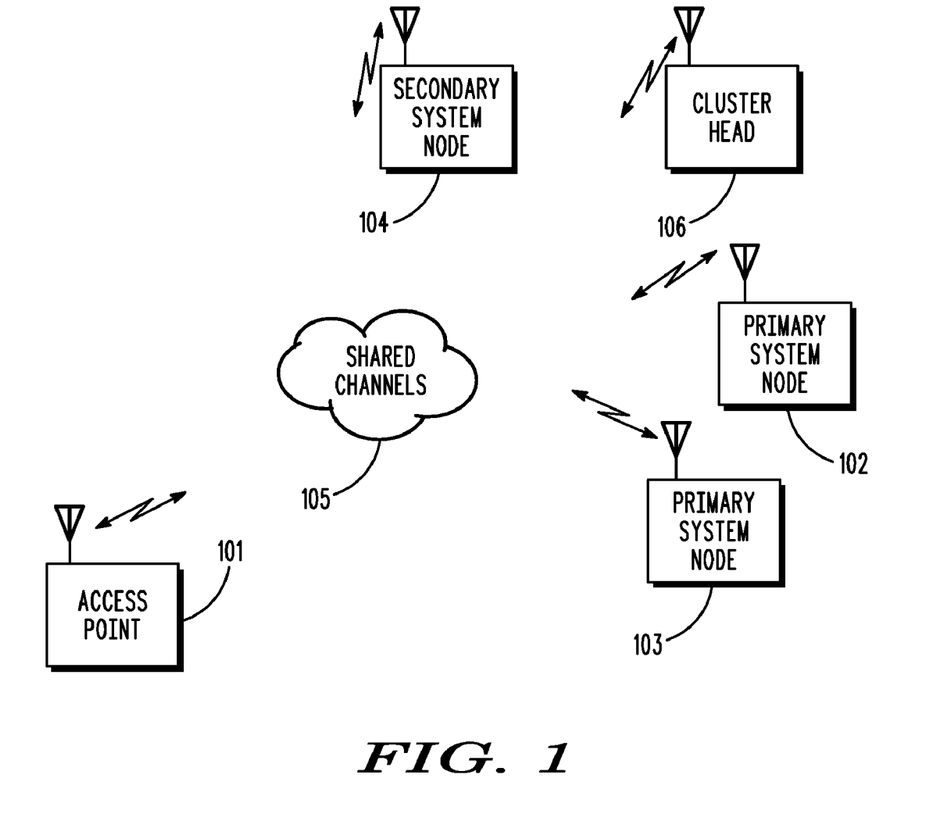
FIG. 1 is a block diagram of nodes communicating over a set of shared channels.

Turning now to the drawings, where like numerals designate like components, FIG. 1 is a block diagram showing nodes communicating over a plurality of shared channels. As shown in FIG. 1, a plurality of nodes 102-103 are part of a wireless local-area network (WLAN) in communication with access point 101. Access point 101 and nodes 102-103 are part of a primary communication system (e.g., 802.11a/g). Nodes 102 and 103 preferably utilize a narrowband channel (e.g., 20 Mhz) for communicating to and receiving transmissions from access point 101. Also included in FIG. 1 is node 104, which utilizes a TDMA-based system protocol (e.g. 802.16m or 3GPP LTE). Node 104 exists as part of a secondary communication system utilizing a broadband channel comprising a plurality of narrowband channels (80-100 MHz) for transmission and reception. Shared channels 105 are provided for use by access point 101 and nodes 102-104.

In this description, the secondary system is attempting to coexist with the primary WLAN system. The secondary system is assumed to have a different physical layer (PHY) than the primary WLAN system. For the sake of discussion assume that the secondary system PHY is an OFDMA PHY. The secondary system is assumed to have software defined radios (SDR) (or equivalents) that are capable of communicating with either an 802.11a/g OFDM PHY or with the OFDMA PHY and can switch dynamically between these PHYs.

The secondary system is made up of a central controller 106 and individual nodes (only node 104 shown). The central controller for the secondary system is generally referred to as a cluster head (CH), but may also be referred to as a base station (BS). The CH and individual nodes of the secondary system have a wideband transceiver (e.g. 80 MHz) that can operate within any of the unlicensed spectrum bands. The secondary system will try to reserve a frame period called an RTDMA frame (reserved TDMA frame) within the unlicensed spectrum. The execution of this mechanism could be within any unlicensed band. However, the 2.4 GHz ISM band contains 12 overlapping channels that may prove difficult to manage since the beacon protocol (discussed later) that starts the RTDMA frame following the inventive mechanism would interfere with beacons on overlapping channels.

It is possible that cognitive algorithms could determine that no unlicensed band users are using an overlapping channel. In this case, the ISM band could be utilized. However, it is preferred to ignore the ISM band for quieting a large broadband channel and focus on the 5 GHz unlicensed bands or some future Greenfield spectrum that does not have overlapping channels.

In order for node 104 to communicate using shared channels 105, all transmissions must cease on the channels utilized by node 104. As discussed above, a problem in using prior-art techniques to quiet channels one-by-one (serially) is that while one idle channel is being quieted by the single transceiver, the multiple adjacent channels may transition from busy to idle, thus giving the primary system users an opportunity to grab one of the idle channels before the secondary system transceiver can get around to quieting each of the newly idled channels.

In order to accomplish this, transmission activity on each channel is analyzed and a best band is identified. Once the band is chosen, a wideband transmitter is utilized to transmit simultaneous reservation messages on consecutive channels simultaneously. Assuming the use of spectrum with non-overlapping channels, the procedure relies on a WLAN system design that anticipates delays in beacon times. The procedure begins by establishing a synchronized common reference time with a pseudo periodic interval that sets a window for a reserved TDMA (RTDMA) frame opportunity for all deployed clusters. During this window, each cluster head (CH) would first quiet the consecutive unlicensed band channels followed by establishment of a frame boundary with the reservation of an RTDMA period. The steps of quieting and reservation are contention based and may result in delays of existing WLAN beacon times. The following description will concentrate on quieting and reservation of consecutive channels for a single cluster.

Figure 2:
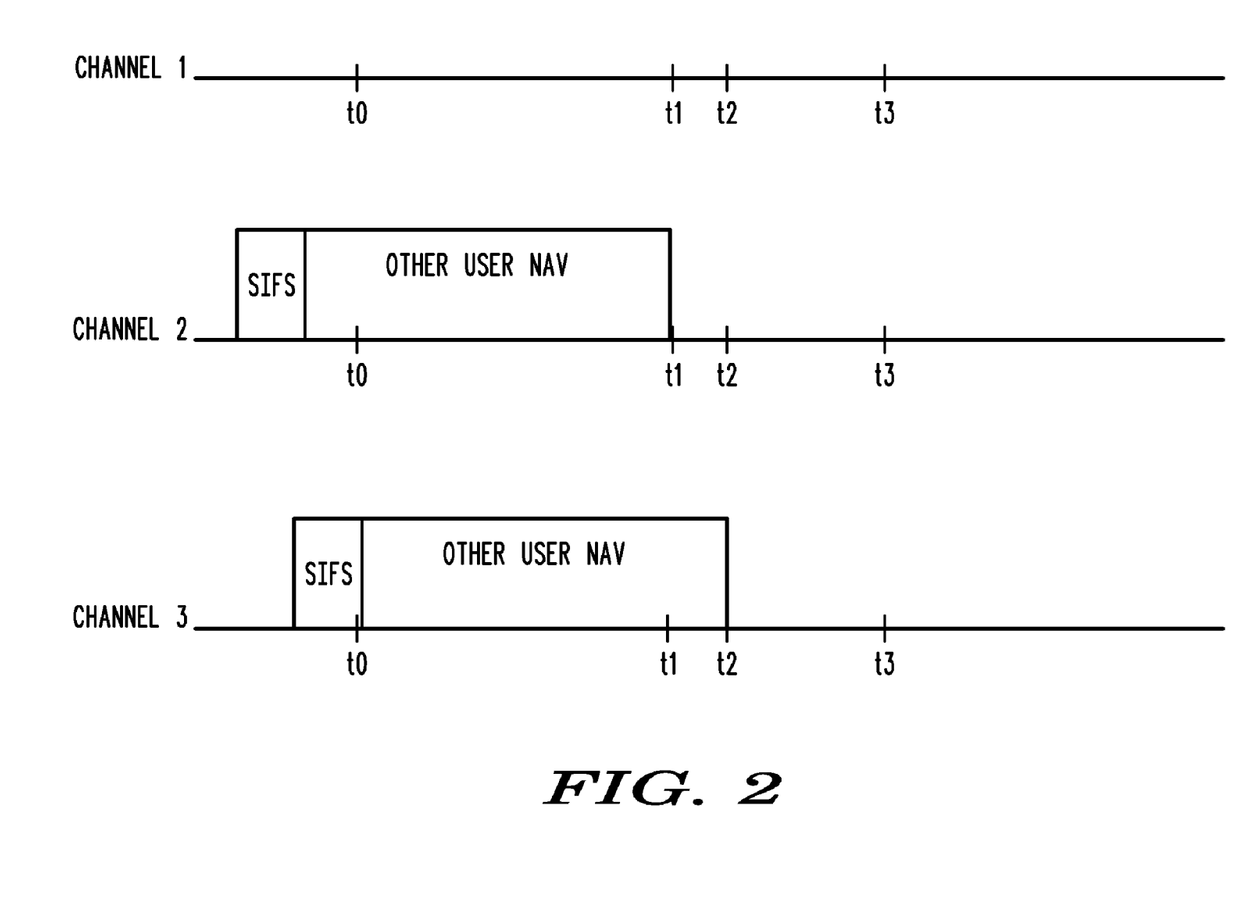
FIG. 2. illustrates quieting of several channels.

The procedure to quiet multiple data channels in the unlicensed band begins by cluster head 106 computing the end time of each current WLAN transmission within the common reference window for the next RTDMA frame opportunity. This step is a repetitive procedure that is invoked prior to the desired start of each RTDMA frame. FIG. 2 illustrates a possible scenario that requires the quieting of multiple channels.

From FIG. 2, it can be seen that at time $t_0$, channel 1 has no activity, channel 2 is currently active, and channel 3 is about to become active (after the expiration of a short inter-frame space (SIFS). Assume that at time $t_0$, the procedure has already been monitoring all three channels. Since cluster head 106 contains a wideband receiver, it is possible that all three channels can be monitored simultaneously. At this point in a first embodiment, cluster head 106 operates with the 802.11a/g PHY and is able to receive symbols from all three channels simultaneously and then process the received symbols from each individual channel sequentially to decode packets. Any decoded packet will contain a Network Allocation Vector (NAV) and this is used to determine how long the WLAN user will occupy the individual channel. Therefore in this example, the procedure has determined that the maximum duration of channel activity to be equivalent to t1 since there were no transmissions on channel 3 before $t_0$. Cluster head 106 will contend on channels 1 and 3 to reserve these channels until time t1. As a high priority task, the procedure will monitor for preferably a SIFS interval (certainly no longer than a minimum length DIFS (distributed control function inter-frame space) interval) before sending a CTS-to-self on channels 1 and 3. Nodes 101-103 will determine that the medium is idle through the use of carrier sensing for a SIFS interval, but will not beginning transmitting unless the medium is idle for a DIFS interval. The CTS-to-self will set the NAV on channels 1 and 3 such that the channels are reserved until shortly beyond time t1 (i.e. the time of the longest prior NAV channel reservation from channel 2).

At time t0+SIFS, a CTS-to-self is sent on channel 1. Unfortunately, during the SIFS interval for channel 3, it was observed by cluster head 106 that another user began using the channel. Furthermore, due to an anomaly that interferes with the ability to decode the NAV on channel 3, the NAV was missed. Consequently, it will be necessary to continue monitoring channel 3 waiting for a subsequent NAV (e.g. data packet following an RTS that contains a NAV), or waiting for the end of transmission on channel 3, or waiting for time t1.

While monitoring channel 3, if a subsequent NAV was detected or if the end of transmission was detected on channel 3, cluster head 106 would monitor for a SIFS interval before sending a CTS-to-self on channel 3 with a NAV that would attempt to keep channel 3 quiet until shortly beyond time t1.

While monitoring channel 3, if time t1 arrives before a subsequent NAV or end of transmission is detected on channel 3, then it will be necessary for the procedure to monitor for a SIFS interval before sending a CTS-to-self on channels 1 and 2. The CTS-to-self will set the NAV on channels 1 and 2 such that the channels are reserved until an arbitrary time t3 in hopes that the user on channel 3 has stopped transmitting. For the sake of brevity, let's assume that t3 is beyond time t2 (the time that channel 3 stops transmitting). Cluster head 106 continues to monitor channel 3 waiting for a subsequent NAV, waiting for the end of transmission on channel 3, or waiting for time t3. When a subsequent NAV is detected or if the end of transmission is detected on channel 3, the procedure will monitor for an SIFS interval before sending a CTS-to-self on channel 3 with a NAV that attempts to keep channel 3 quiet until time t3 (i.e. keep channel 3 quiet until the same point in time that channels 1 and 2 are now reserved for).

Note that with the use of a single transceiver, the procedure described above can experience a WLAN user occupying one idle channel while a second idle channel is being reserved with a CTS-to-self. The procedure is further enhanced to manage multiple channels at the same time to help mitigate these windows of opportunity for WLAN users to retake a channel. This enhancement is dependant on which channels are still busy and which are currently free/idle. There are two conditions to manage. In the first condition where there are multiple contiguous (in frequency) free channels to keep quiet, multiple CTS-to-self messages (one on each channel) are synthesized by cluster head 106 as one message transmission with a single wideband radio. This closes a window of channel availability that would be present with sequential quieting steps.

In the second condition, if some of the free channels are not contiguous with the rest (e.g. a busy channel is adjacent and in between two free channels), it may be necessary for each of the non-contiguous free channels to alternate transmission periods to keep the free channels quiet/busy with secondary, followed by or interleaved with a common sensing period to resume busy channel monitoring (see example as shown in FIG. 2). This is done to help minimize power leakage in the busy channels that are sandwiched between the idle channels, thus improving the fairness of the quieting procedure to be more considerate of the WLAN users (Note that WLAN users already impact other WLAN users on adjacent channels due to power leakage).

Two methods are used to quiet non-contiguous channels depending on the available information regarding the expected duration of active transmissions on busy channels. In the first method, the CTS-to-self NAV is set to coincide with the longest duration of the active transmissions of WLAN CSMA users (if known from reception of the NAV of the active transmissions). Multiple CTS-to-self messages may be sent during this NAV duration to mitigate the possibility of a deaf node starting its own transmission during the NAV interval (i.e. the NAV interval may be much larger than the transmission time of the CTS-to-self message). The common sensing time will need to be larger than the Clear Channel Assessment (CCA) time duration to sense the channel (e.g. 5 microseconds).

Figure 3:
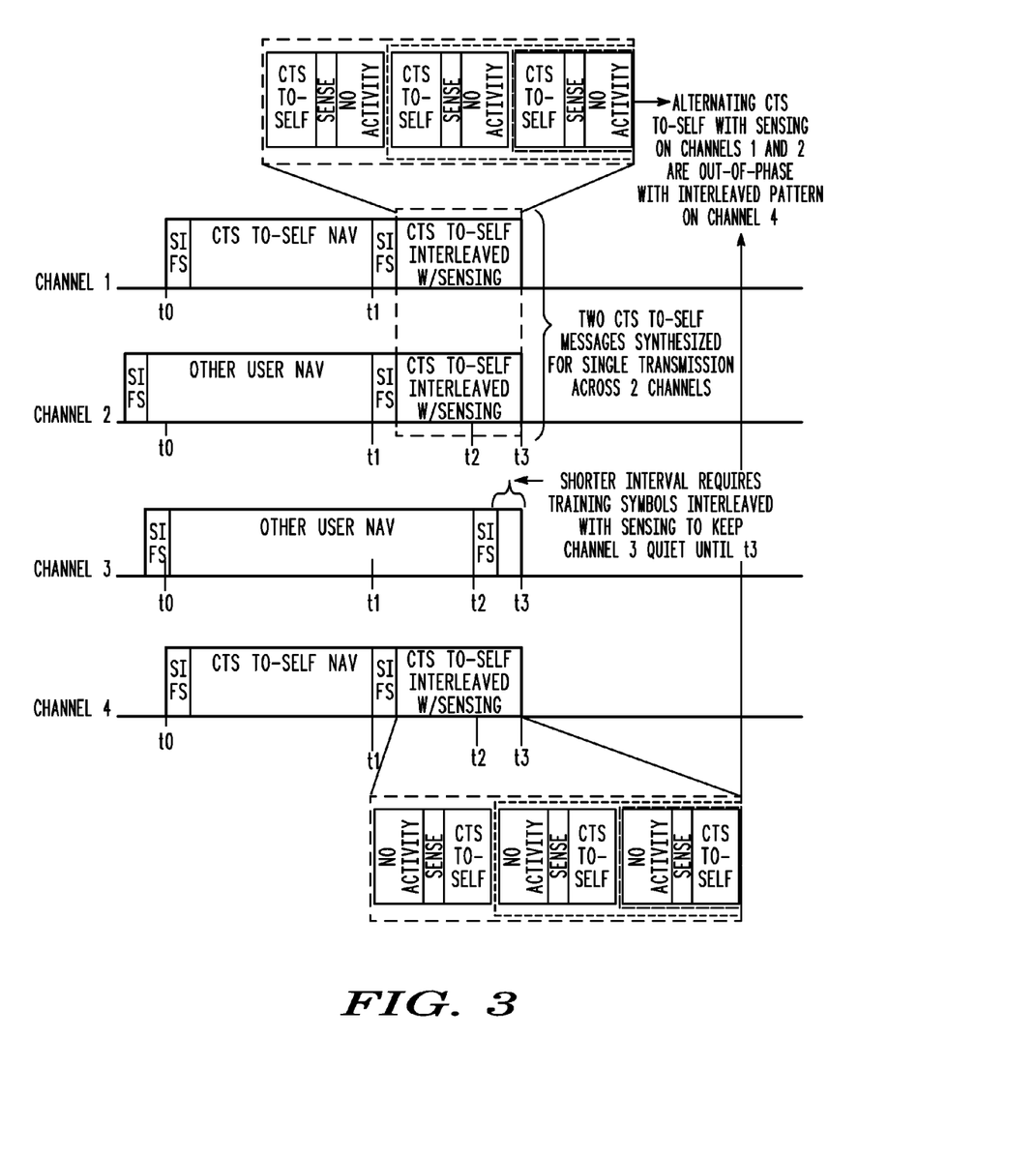
FIG. 3. illustrates quieting of several channels.

In the second method when the NAV for a busy channel of an active transmission is unknown or the NAV is known, but the end of transmission is shorter than the time to transmit a CTS-to-self message, cluster head 106 will transmit valid training symbols to keep the free channels reserved (see example as shown in FIG. 3). This will allow finer granularity for keeping idle channels quiet.

The transmission of these training symbols may be synthesized as a single wideband transmission on multiple contiguous WLAN channels, or may be alternated on non-contiguous WLAN channels. These transmissions would be followed by or interleaved with common sensing periods. For example, consider the following. Using the minimum data rate for 802.11a/g, the minimum CTS-to-self message duration is 53 microseconds. The DIFS duration for 802.11a/g is 34 microseconds. The normal data symbol duration in 802.11g is 4 microseconds. Each 802.11 data transmission starts with 10 short training symbols that are necessary for OFDM symbol synchronization. The 10 short training symbols take 8 microseconds to transmit. Additionally, the Clear Channel Assessment (CCA) time duration to sense the channel is 5 microseconds. Thus, the transmission of the 10 short training symbols enables a nearby station to recognize that it must avoid using the channel because another station has already started an 802.11 transmission. Therefore, it is possible to fake the start of an 802.11 transmission with training symbols when the transmission signal is higher than the CCA threshold. With a DIFS interval of 34 microseconds, it is possible to have at least two transmission periods and one listening period each of 8 microseconds to keep two nonadjacent channels busy while sensing the end of active transmissions on the remaining busy channels. Also note that the training symbols could be mixed with the transmission of a CTS-to-self as a synthesized single wideband transmission followed with a common sensing period.

Note that three events are happening so that communications can begin on channels 1-4 at $t_3$. First, wideband transmission of CTS-to-self on 1 and 2, second, a narrowband CTS-to-self transmission takes place on channel 4 (alternatively w/channel 1 and 2), finally, when channel 3 becomes available, transmission of symbols takes place until $t_3$.

Figure 4:
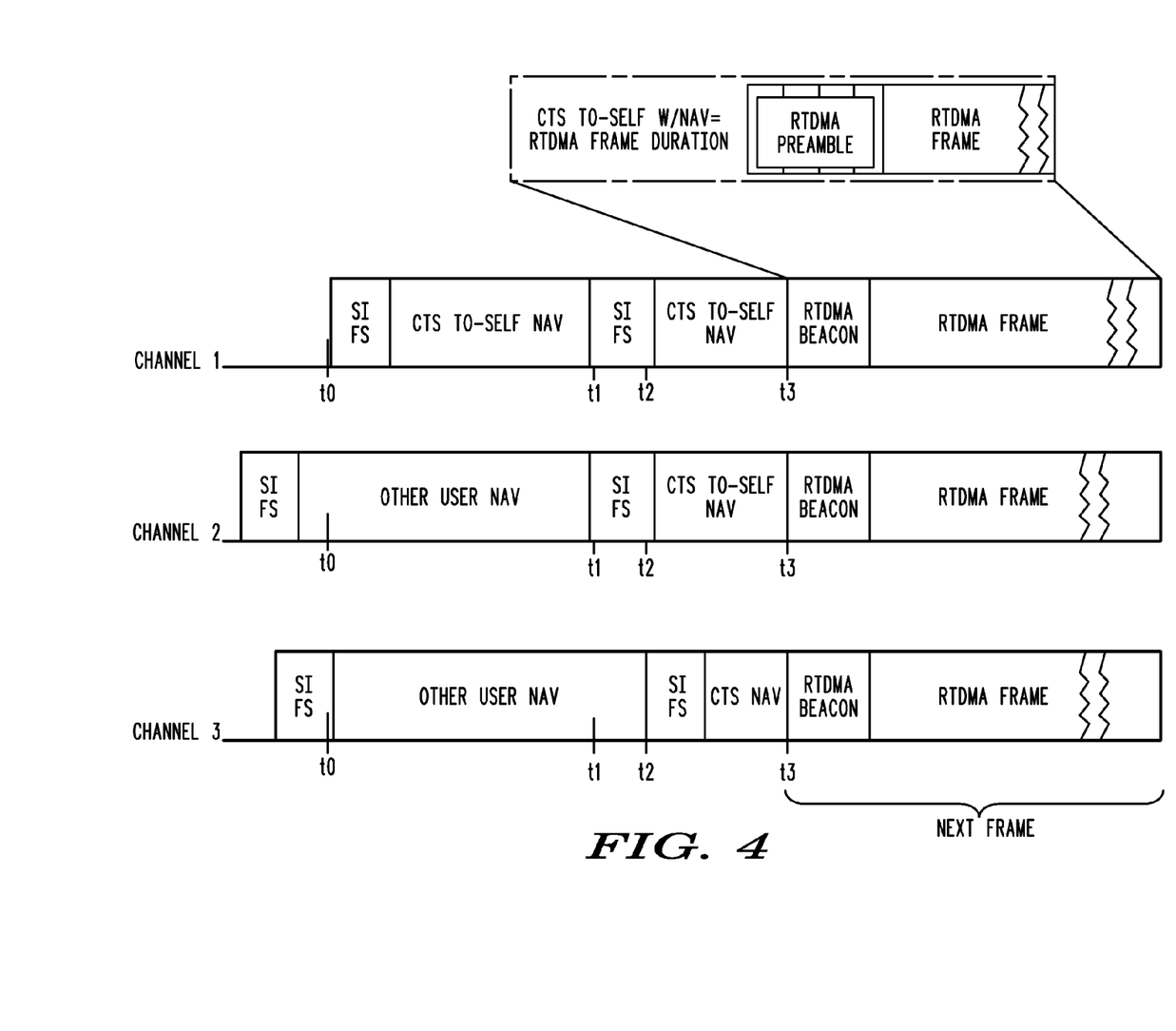
FIG. 4 illustrates quieting of several channels.

Refer now to FIG. 4. Once the secondary communication system controls all channels at time t3, the procedure then moves to reserve all channels for the duration of the next RTDMA frame. To accomplish this, the procedure must start an RTDMA frame with the same duration in each channel using an RTDMA Beacon that will establish a pseudo-periodic frame boundary. The RTDMA Beacon will consist of a CTS-to-self (or equivalent) containing a NAV that reserves the WLAN channels for the duration of the RTDMA frame followed by a short sequence of symbols (e.g. a unique preamble that defines the start of the RTDMA frame). The CTS-to-self is sent on all channels as a single synthesized transmission using, for example, the 802.11a/g PHY to insure that the WLAN nodes in the region are quieted for the duration of the RTDMA frame. The short sequence is transmitted using the secondary OFDMA PHY so that secondary nodes at the fringe of a secondary cluster can be assured of hearing the beacon (i.e. the 802.11a PHY has less range). The RTDMA Beacon must be sent on all channels. The NAV associated with the beacon reserves each channel for the duration of the RTDMA frame. Note that the SIFS is not used to monitor the channels before transmitting the beacon since all channels were reserved by the secondary system for the secondary nodes.

Note that the CTS-to-self packets (or the before mentioned short training sequence to fake a WLAN transmission) will be sent using the 802.11a/g PHY. The reason is that the primary CSMA user we are trying to quiet is WLAN. Using the 802.11a/g PHY will enable them to understand the message.

When reserving 80 MHz of spectrum proves to be difficult, there will need to be metrics collected to evaluate the success rate of an unlicensed broadband multi-channel reservation/quieting procedure. Poor success may be due to either hidden nodes that cannot be quieted or due to large packets sent by WLAN devices during the multi-channel quieting procedure. For example, if a large number of packets or frames are disrupted due to the inability to quiet hidden nodes, it is possible to take advantage of dynamic bandwidth allocation. Essentially, if only 2 consecutive channels are consistently error free, you dynamically adjust the bandwidth allocation to 40 MHz. If there is only one channel that is free of packet errors, then you only get a 20 MHz bandwidth allocation. Alternatively, if the collected metrics show that a particular channel is consistently being used to send large packets such that the quieting procedure is consistently waiting for the channel to relinquish control, the secondary system could adapt the bandwidth to utilize a lesser number of channels, hence smaller bandwidth. These adaptations would remain in effect for perhaps minutes or longer so that the scheduler has time to modify the long term allocations to match the reduced or expanded bandwidth.

Figure 5:
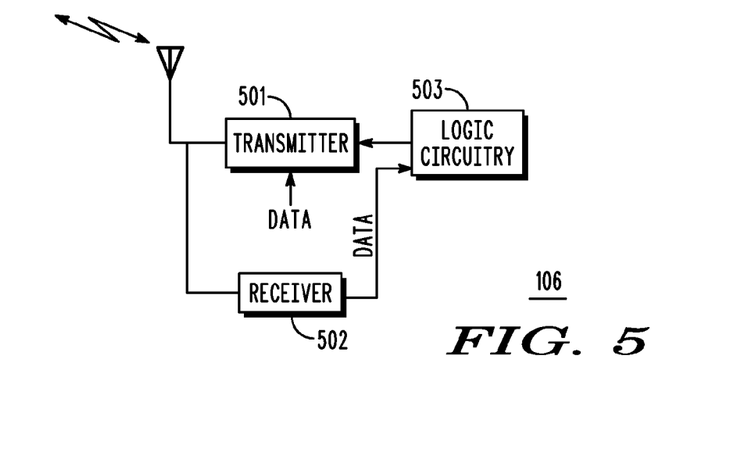
FIG. 5 is a block diagram of a cluster head.

FIG. 5 is a block diagram of a cluster head equipped to quiet channels on a primary communication system. Cluster head 106 comprises transmitter 501, receiver 502, both coupled to logic circuitry/microprocessor 503. As discussed above, transmitter 501 comprises a wideband transmitter, while receiver 502 comprises a wideband receiver. Both transmitter 501 and receiver 502 are equipped to operate via both a primary system air interface (e.g. a CSMA system such as IEEE 802.11) or a secondary system air interface (e.g. a TDMA-based system such as IEEE 802.16, LTE, or similar communication system protocol).

During operation of cluster head 106, channels are quieted on the primary communication system by transmitting messages designed to quiet the channels. As discussed one or more CTS-to-self messages or training symbols may be synthesized and transmitted as either a narrowband or wideband signal to quiet the channels. Operation of cluster head 106 takes place as described in FIG. 6.

Figure 6:
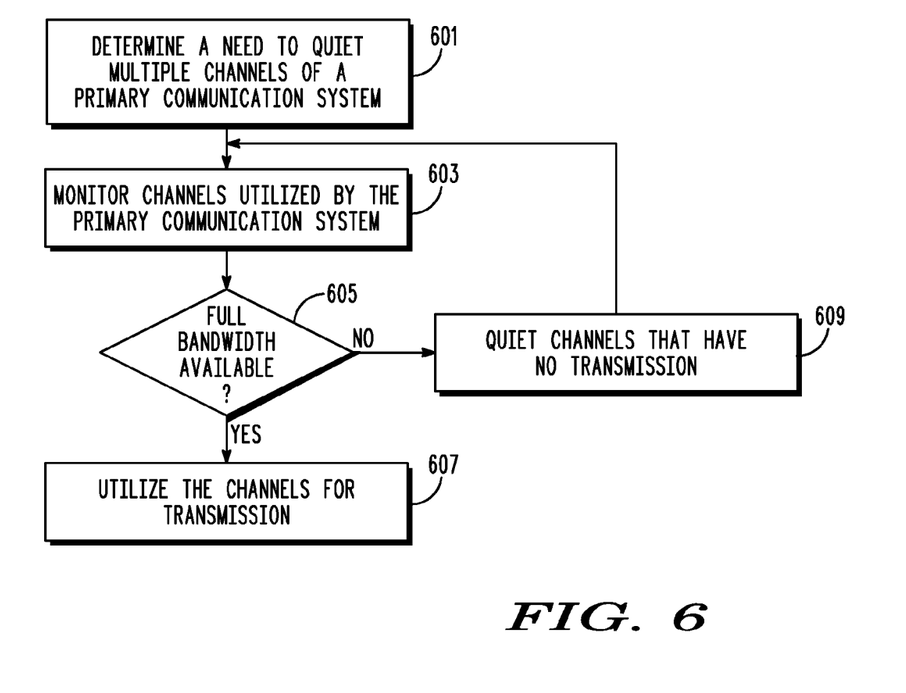
FIG. 6 is a flow chart showing operation of the cluster head of FIG. 5.

FIG. 6 is a flow chart showing operation of the cluster head of FIG. 5 acting as part of a secondary communication system, quieting channels of a primary communication system. The logic flow begins at step 601 where logic circuitry 503 determines a need to quiet multiple channels of a primary communication system. At step 603, logic circuitry 503 utilizes receiver 502 to monitor the spectrum (channels) utilized by the primary communication system. It should be noted that the step of monitoring may require ceasing any transmissions in order to sense if the channels have become, or are available. The step of monitoring takes place utilizing a single receiver 502. A determination is then made by logic circuitry 503 if the full bandwidth needed for secondary transmission is available (step 605).

As discussed above, some primary channels may be available for secondary transmission, but logic circuitry 503 may determine that additional channels are be needed. If this is the case, then the logic flow continues to step 609 where the available channels are quieted and maintained in a quiet state. This quieting may take place by logic circuitry 503 instructing transmitter 501 to send multiple CTS-to-self messages (one on each channel) each containing a NAV that will quiet the channels until the needed bandwidth becomes available. If the time period to quiet the channels is small, then training symbols may be transmitted until the necessary bandwidth becomes available. Additionally, if the available channels are consecutive in frequency, a single wideband transmitter 501 is utilized to transmit simultaneous reservation messages on the consecutive channels simultaneously to keep the channels quiet. The multiple reservation messages are synthesized by logic circuitry 503 as one message transmission with a single wideband radio, and sent to transmitter 501 for transmission. Regardless of the technique utilized to quiet the channels, the logic flow returns to step 603.

Returning to step 605, if the full bandwidth is available for secondary transmissions, then the logic flow continues to step 607 where logic circuitry 503 utilizes transmitter 501 to transmit on the available bandwidth (e.g., multiple consecutive channels and the additional channels that became available).

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method for a first communication system to quiet multiple channels being utilized by a second communication system, the method comprising:
at a cluster head operating in the first communication system:
monitoring channels utilized by the second communication system;
determining that available bandwidth does not exist for transmission by the first communication system;
quieting multiple consecutive channels by simultaneously transmitting a message on each of the consecutive channels, wherein the message is synthesized as one message transmission with a single wideband radio;
determining that additional channels of the second communication system have become available including ceasing transmission on each of the consecutive channels in order to sense when the additional channels have become available; and
transmitting on the multiple consecutive channels and the additional channels.

2. The method of claim 1 wherein the message comprises a Clear To Send (CTS)-to-self message.

3. The method of claim 2 wherein the CTS-to-self message comprises a Network Allocation Vector (NAV) that is used to indicate how long the first communication system will occupy the multiple consecutive channels.

4. The method of claim 1 wherein the message comprises a Network Allocation Vector (NAV) that is used to indicate how long the first communication system will occupy the multiple consecutive channels.

5. The method of claim 1 wherein the message comprises training symbols to keep the multiple consecutive channels reserved.

6. The method of claim 1 wherein monitoring channels comprises monitoring channels via a single receiver.

7. The method of claim 1 wherein simultaneously transmitting the message on each of the consecutive channels comprises utilizing a single transmitter to simultaneously transmit the message.

8. A cluster head operating in a first communication system and used to quiet multiple channels being utilized by a second communication system, the cluster head comprising:
a receiver for monitoring channels utilized by the second communication system;
a transmitter; and
logic circuitry for determining that available bandwidth does not exist for transmission by the first communication system, instructing the transmitter to quiet multiple consecutive channels by simultaneously transmitting a message on each of the consecutive channels, wherein the message is synthesized as one message transmission with a single wideband radio, determining that additional channels of the second communication system have become available including ceasing transmission on each of the consecutive channels in order to sense when the additional channels have become available, and utilizing the transmitter to transmit on the multiple consecutive channels and the additional channels.

9. The cluster head of claim 8 wherein the message comprises a Clear To Send (CTS)-to-self message.

10. The cluster head of claim 9 wherein the CTS-to-self message comprises a Network Allocation Vector (NAV) that is used to indicate how long the first communication system will occupy the multiple consecutive channels.

11. The cluster head of claim 8 wherein the message comprises a Network Allocation Vector (NAV) that is used to indicate how long the first communication system will occupy the multiple consecutive channels.

12. The cluster head of claim 8 wherein the message comprises training symbols to keep the multiple consecutive channels reserved.

13. A method for a first communication system to quiet multiple channels being utilized by a second communication system, the method comprising:

at a cluster head operating in the first communication system:

utilizing a receiver to monitor channels utilized by the second communication system;

determining that available bandwidth does not exist for transmission by the first communication system;

utilizing a single transmitter to quiet multiple consecutive channels by simultaneously transmitting a Clear To Send (CTS)-to-self message or training symbols on each of the consecutive channels, wherein the message is synthesized as one message transmission transmitted by the single transmitter;

determining that additional channels of the second communication system have become available including ceasing transmission on each of the consecutive channels in order to sense when the additional channels have become available; and transmitting on the multiple consecutive channels and the additional channels.

* * * * *

UNITED STATES PATENT AND TRADEMARK OFFICE
CERTIFICATE OF CORRECTION

| | |
|---|---|
| PATENT NO. | : 8,179,873 B2 |
| APPLICATION NO. | : 12/251096 |
| DATED | : May 15, 2012 |
| INVENTOR(S) | : Bonta et al. |

Page 1 of 1

It is certified that error appears in the above-identified patent and that said Letters Patent is hereby corrected as shown below:

On the Face Page, in Field (54), under Title, in Column 1, Line 1, and in Column 1, Line 1, delete "QUITE" and insert -- QUIET --, therefor.

Signed and Sealed this
Eighth Day of January, 2013

David J. Kappos
*Director of the United States Patent and Trademark Office*